(12) United States Patent
Kress et al.

(10) Patent No.: US 9,551,872 B1
(45) Date of Patent: Jan. 24, 2017

(54) SPATIALLY MULTIPLEXED LENS FOR HEAD MOUNTED DISPLAY

(71) Applicant: Google Inc., Mountain View, CA (US)

(72) Inventors: Bernard C. Kress, Redwood CIty, CA (US); Greg E. Priest-Dorman, Berkeley, CA (US)

(73) Assignee: Google Inc., Mountain View, CA (US)

( * ) Notice: Subject to any disclaimer, the term of this patent is extended or adjusted under 35 U.S.C. 154(b) by 51 days.

(21) Appl. No.: 14/144,207

(22) Filed: Dec. 30, 2013

(51) Int. Cl.
*G02B 27/14* (2006.01)
*G02B 27/01* (2006.01)

(52) U.S. Cl.
CPC ................. *G02B 27/0172* (2013.01)

(58) Field of Classification Search
CPC .................................... G02B 27/017
USPC ........................................ 359/630
See application file for complete search history.

(56) References Cited

U.S. PATENT DOCUMENTS

| | | | |
|---|---|---|---|
| 5,579,164 A | 11/1996 | Chapnik | |
| 6,867,888 B2 | 3/2005 | Sutherland et al. | |
| 2004/0164927 A1 | 8/2004 | Suyama et al. | |
| 2006/0023065 A1 | 2/2006 | Alden | |
| 2007/0052876 A1 | 3/2007 | Kaufman et al. | |
| 2007/0195409 A1 | 8/2007 | Yun et al. | |
| 2008/0117289 A1 | 5/2008 | Schowengerdt et al. | |
| 2009/0174918 A1 | 7/2009 | Zhuang et al. | |
| 2009/0189974 A1 | 7/2009 | Deering | |
| 2011/0007277 A1 | 1/2011 | Solomon | |
| 2011/0018903 A1 | 1/2011 | Lapstun et al. | |
| 2012/0021848 A1 | 1/2012 | Watson | |
| 2012/0032872 A1 | 2/2012 | Kuhlman et al. | |
| 2012/0081800 A1 | 4/2012 | Cheng et al. | |
| 2012/0249797 A1 | 10/2012 | Haddick et al. | |
| 2013/0033756 A1 | 2/2013 | Spitzer et al. | |
| 2013/0141311 A1 | 6/2013 | Ho et al. | |
| 2013/0222384 A1 | 8/2013 | Futterer | |
| 2013/0286047 A1 | 10/2013 | Katano et al. | |
| 2013/0314793 A1* | 11/2013 | Robbins ................. | G02B 5/18 359/573 |
| 2013/0342571 A1 | 12/2013 | Kinnebrew et al. | |
| 2014/0002626 A1 | 1/2014 | Yu et al. | |

FOREIGN PATENT DOCUMENTS

KR  10-1143558 B1  6/2012

OTHER PUBLICATIONS

Zheng, Z. et al., "Design and fabrication of an off-axis see-through head-mounted display with an x—y polynomial surface," Applied Optics, vol. 49, Issue 19, pp. 3661-3668 (2010), Optical Society of America. http://dx.doi.org/10.1364/AO.49.003661.

(Continued)

*Primary Examiner* — James Jones
(74) *Attorney, Agent, or Firm* — Blakely Sokoloff Taylor & Zafman LLP

(57) ABSTRACT

An optical combiner includes an off-axis spatially multiplexed lens optically coupled to receive image light and direct the image light in an eye-ward direction. The off-axis spatially multiplexed lens includes a first sub-lens multiplexed with a second sub-lens. The first sub-lens and the sub-lens are configured to direct the image light to designated eyeward-regions.

13 Claims, 14 Drawing Sheets

(56) References Cited

OTHER PUBLICATIONS

Kress, B. C. et al., "Applied Digital Optics: From Micro-Optics to Nanophotonics," Chapter 10: Digital Nano-optics, Oct. 2009, pp. 253-293, John Wiley & Sons, Ltd, Chichester, UK. ISBN: 978-0-470-02263-4.
Kress, B. C. et al., "Applied Digital Optics: From Micro-Optics to Nanophotonics," Chapter 12: Digital Optics Fabrication Techniques, Oct. 2009, pp. 339-411, John Wiley & Sons, Ltd, Chichester, UK. ISBN: 978-0-470-02263-4.
Kress, B. C. et al., "Applied Digital Optics: From Micro-Optics to Nanophotonics," Chapter 13: Design for Manufacturing, Oct. 2009, pp. 413-452, John Wiley & Sons, Ltd, Chichester, UK. ISBN: 978-0-470-02263-4.
Kress, B. C. et al., "Applied Digital Optics: From Micro-Optics to Nanophotonics," Chapter 14: Replication Techniques for Digital Optics, pp. 453-478, Oct. 2009, John Wiley & Sons, Ltd, Chichester, UK. ISBN: 978-0-470-02263-4.
PCT/US2015/010507; PCT International Search Report & Written Opinion, mailed Apr. 15, 2015, 11 pages.

* cited by examiner

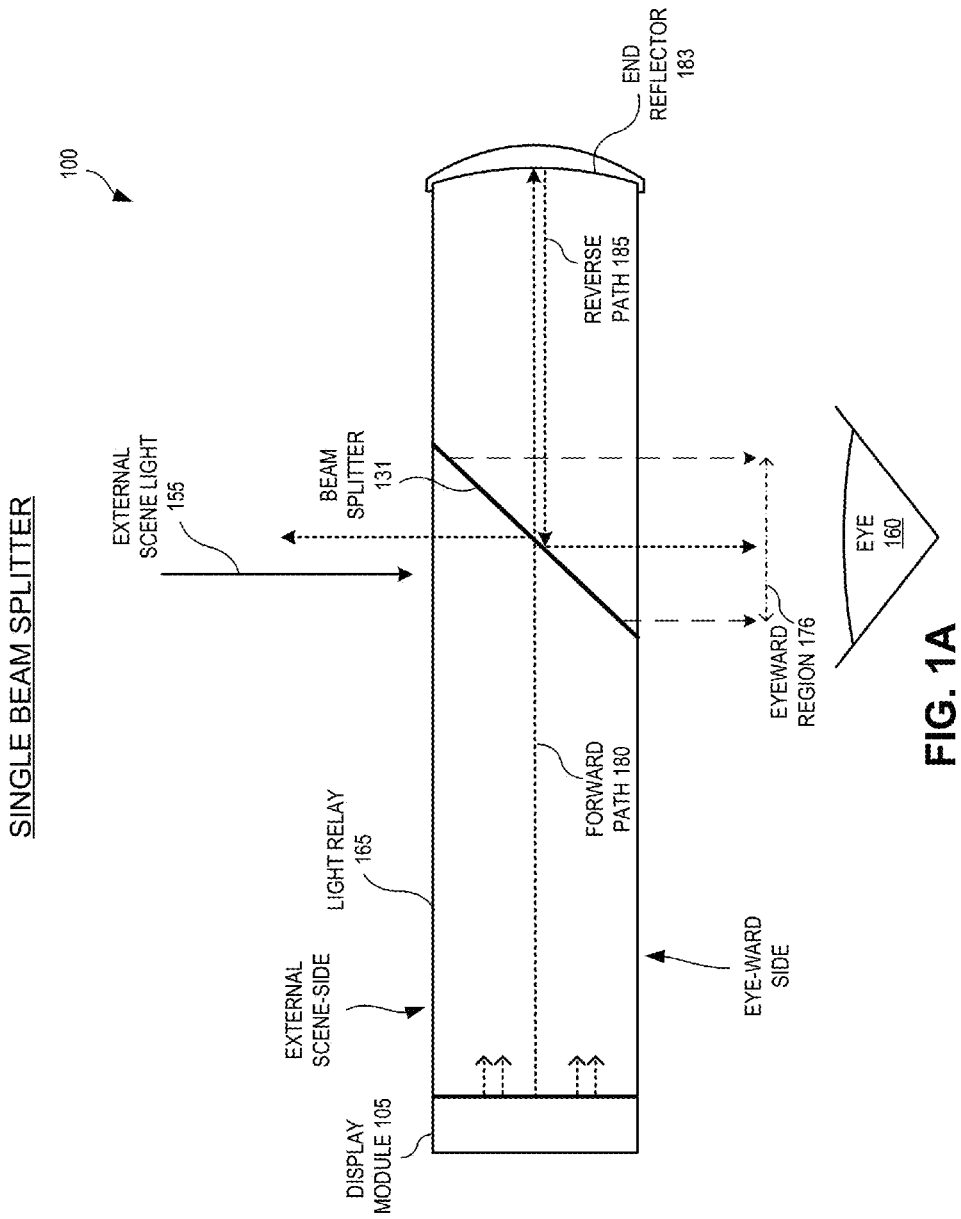

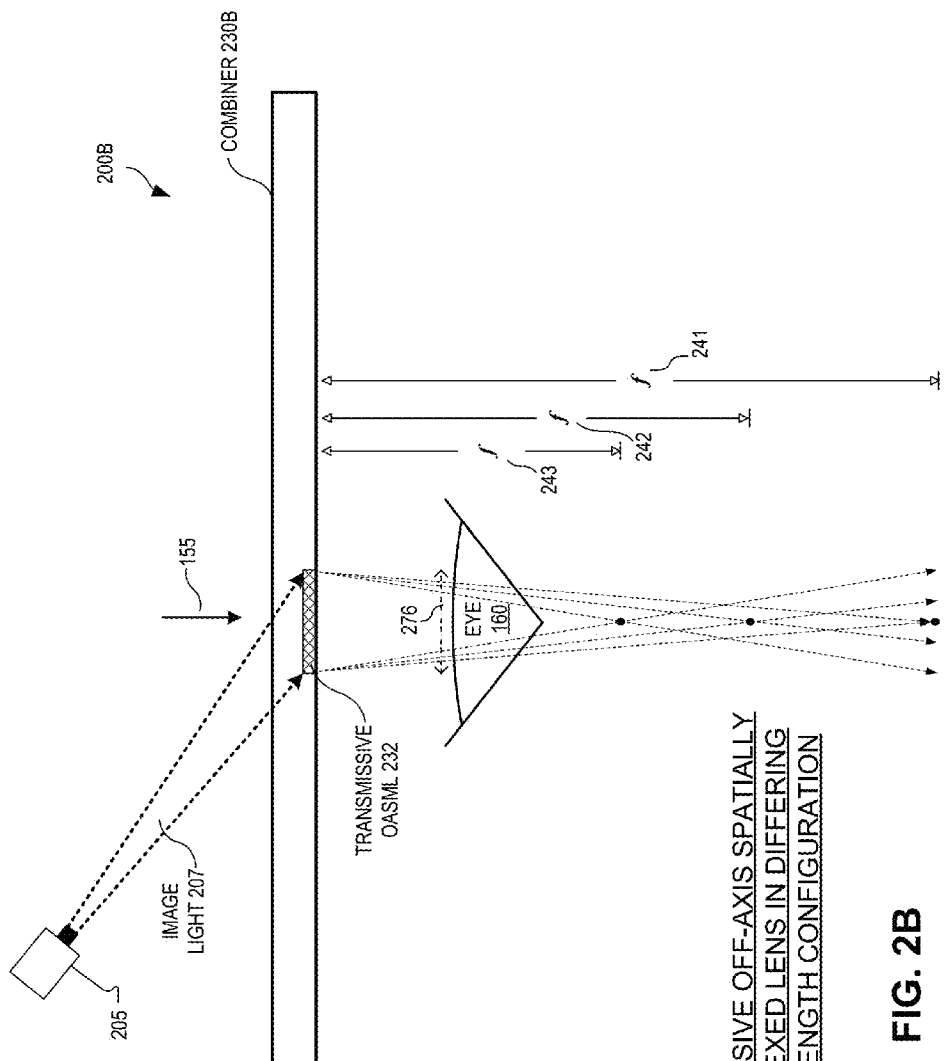

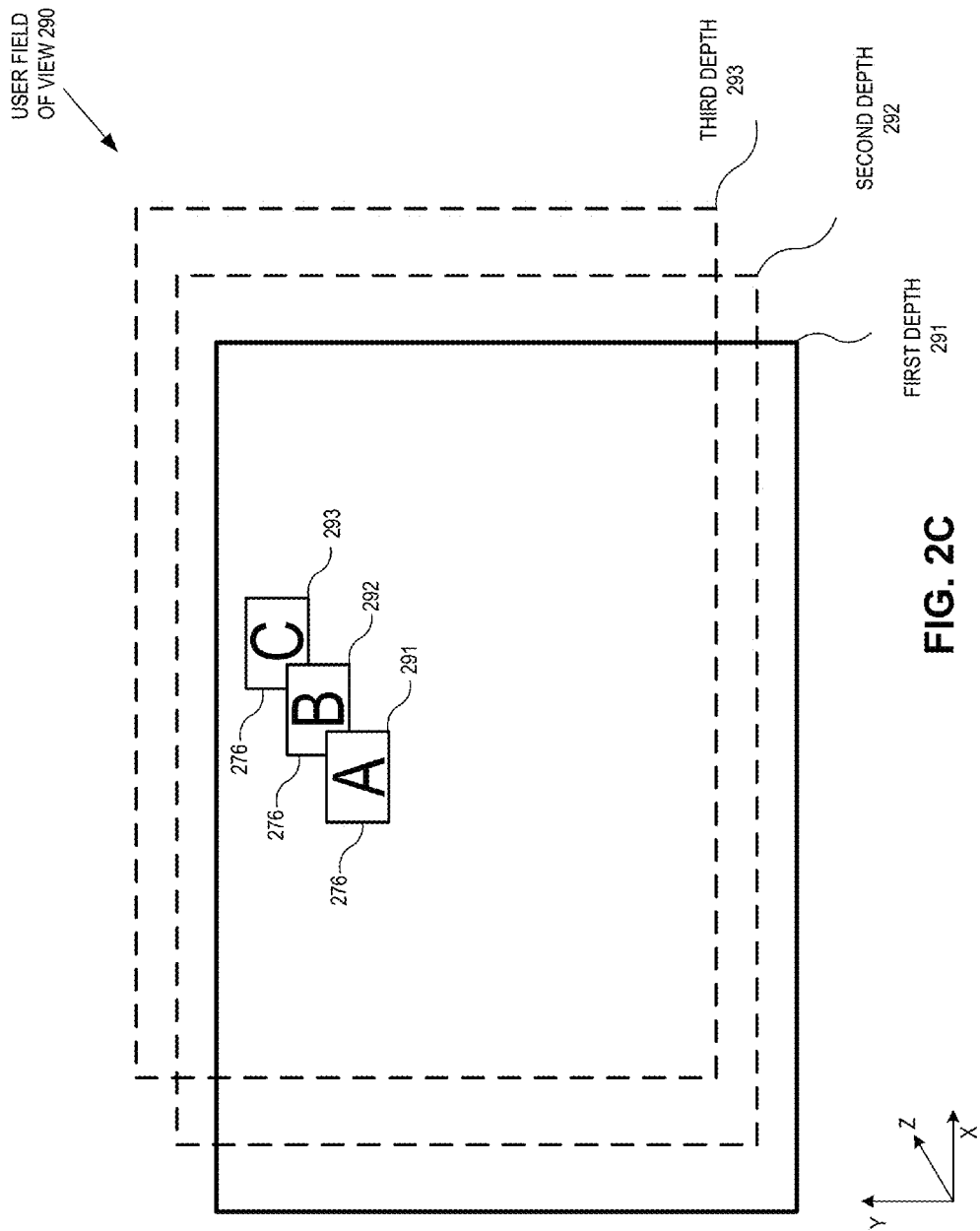

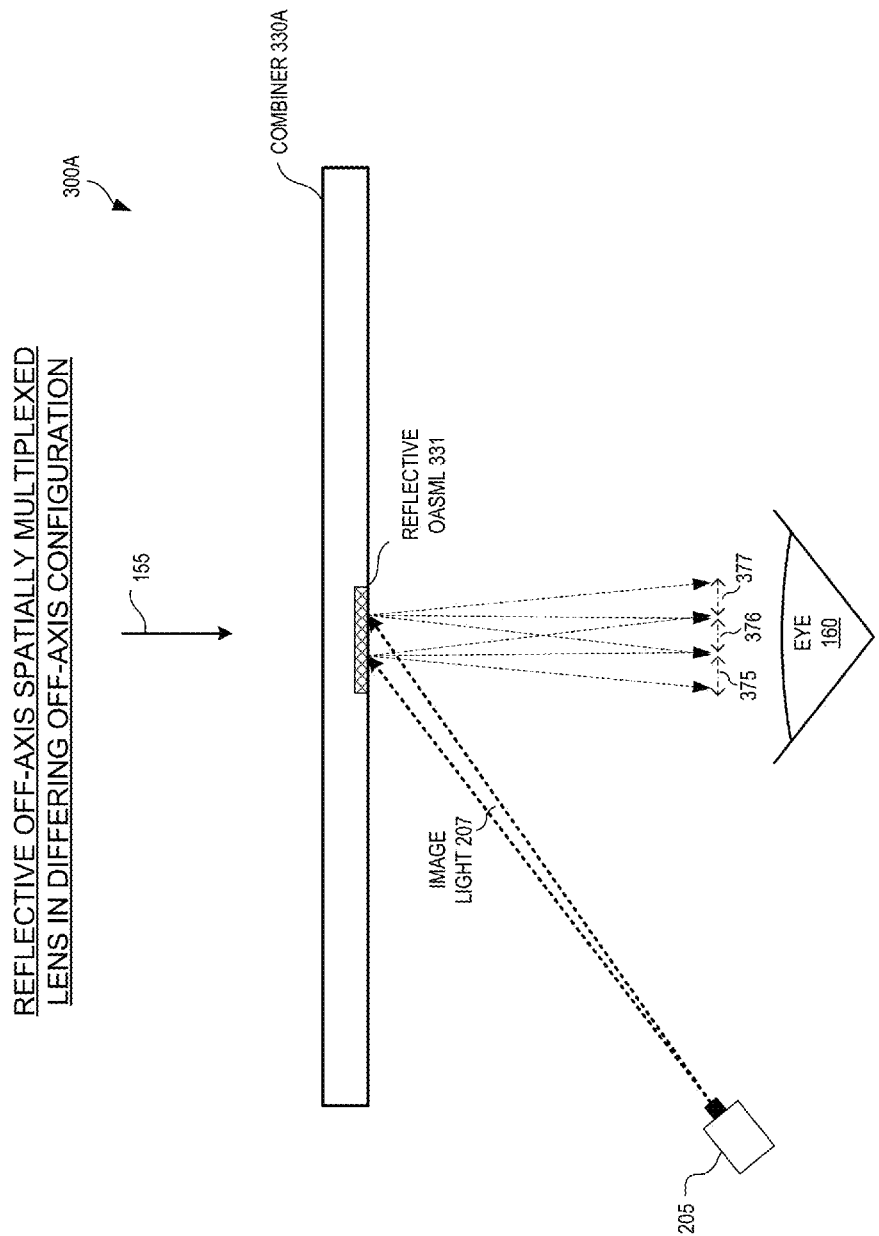

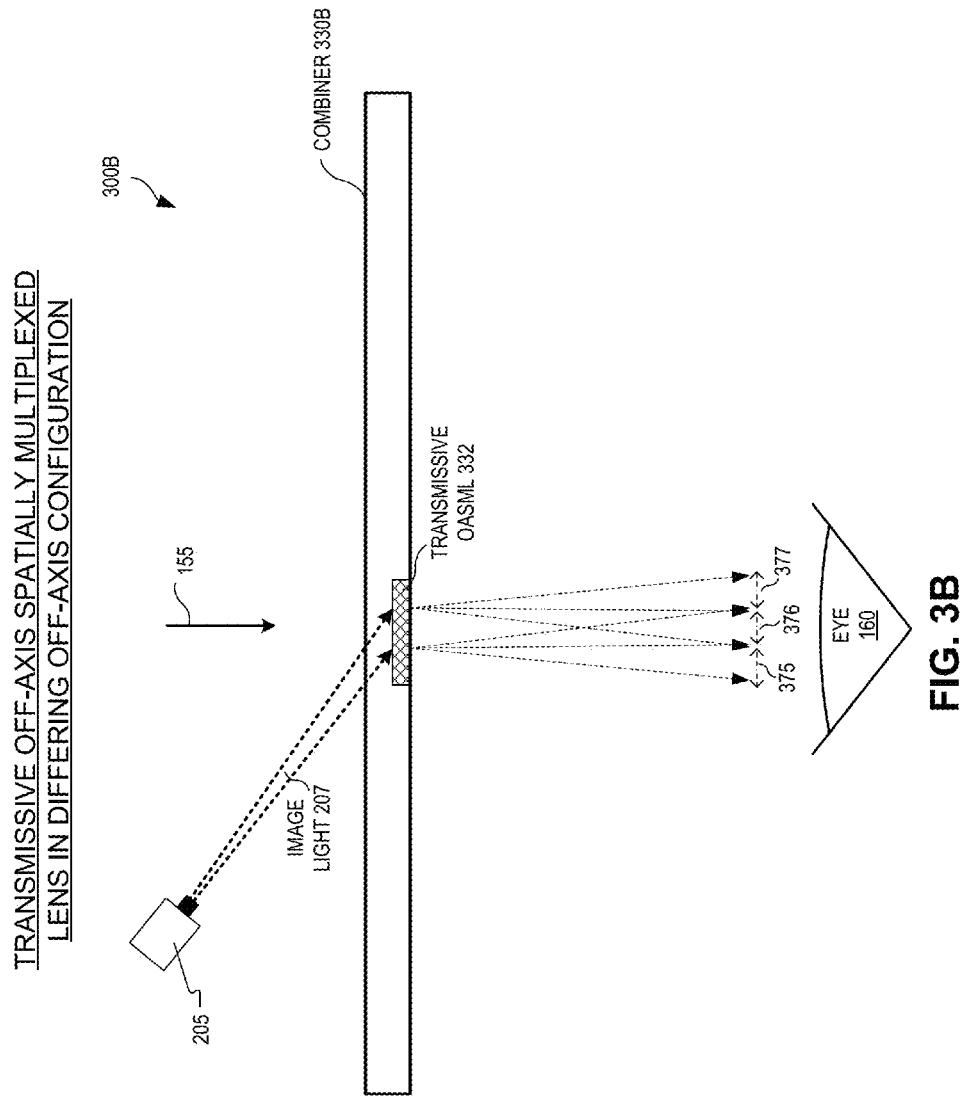

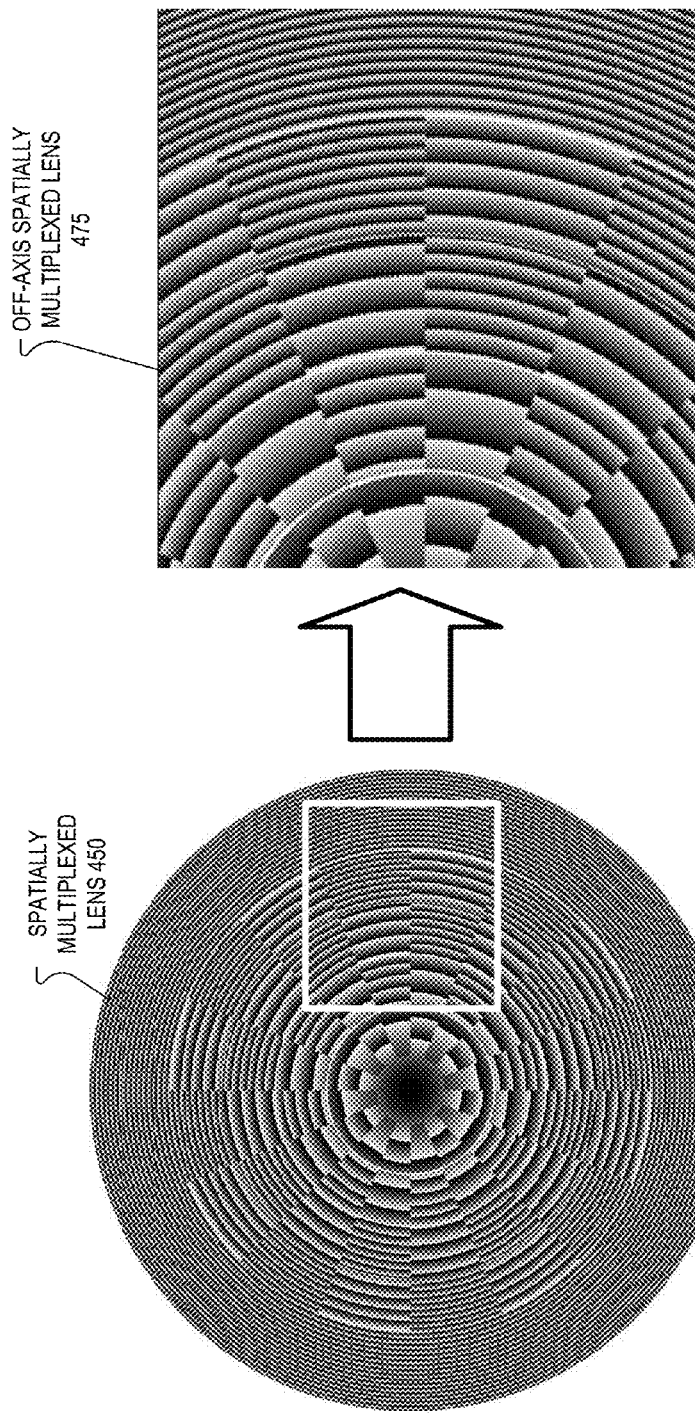

SPATIALLY MULTIPLEXED LENS FOR HEAD MOUNTED DISPLAY

TECHNICAL FIELD

This disclosure relates generally to optics, and in particular but not exclusively, relates to optical combiners in Head Mounted Displays ("HMDs").

BACKGROUND INFORMATION

A head mounted display ("HMD") is a display device worn on or about the head. HMDs usually incorporate some sort of near-to-eye optical system to form a virtual image located somewhere in front of the viewer. Single eye displays are referred to as monocular HMDs while dual eye displays are referred to as binocular HMDs. Occlusion HMDs, also called immersion HMDs, project a virtual image over a black background (the projection optics are not see-through). See-through HMDs also project a virtual image, but they are at the same time transparent (or semi-transparent) and the projection optics are called combiner optics, since they combine the virtual image over the reality. Augmented reality is one aspect of see-through HMDs, where the virtual image is super-imposed to the reality.

HMDs have numerous practical and leisure applications. Historically, the first applications were found in aerospace applications, which permit a pilot to see vital flight control information without taking their eye off the flight path (these are referred to as Helmet Mounted Displays and are often used for rotary wing aircrafts). Heads Up Displays ("HUDs") are usually used in non-rotary wing aircrafts such as planes and jet fighters, where the combiner is located on the windshield rather than on the helmet. HUDs are also used in automobiles, where the optical combiner can be integrated in the windshield or close to the windshield. Public safety applications include tactical displays of maps and thermal imaging. Other application fields include video games, transportation, and telecommunications. There is certain to be newfound practical and leisure applications as the technology evolves; however, many of these applications are limited due to the size, weight, field of view, and efficiency of conventional optical systems used to implement existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 1A depicts a top cross-section view of an example optical combiner including a display module, a light relay, a beam splitter, and an end reflector.

FIG. 2B illustrates an optical combiner including a transmissive OASML, in accordance with an embodiment of the disclosure.

FIG. 2C illustrates computer generated images directed into different depths of the same eye-ward region by an OASML, in accordance with an embodiment of the disclosure.

FIG. 3A illustrates an optical combiner including an example reflective OASML reflecting portions of image light toward multiple eyeward-regions, in accordance with an embodiment of the disclosure.

FIG. 3B illustrates an optical combiner including a transmissive OASML, in accordance with an embodiment of the disclosure.

FIGS. 4A-4G illustrate a conceptual process of fabricating an OASML, in accordance with an embodiment of the disclosure.

DETAILED DESCRIPTION

Figure 1B:
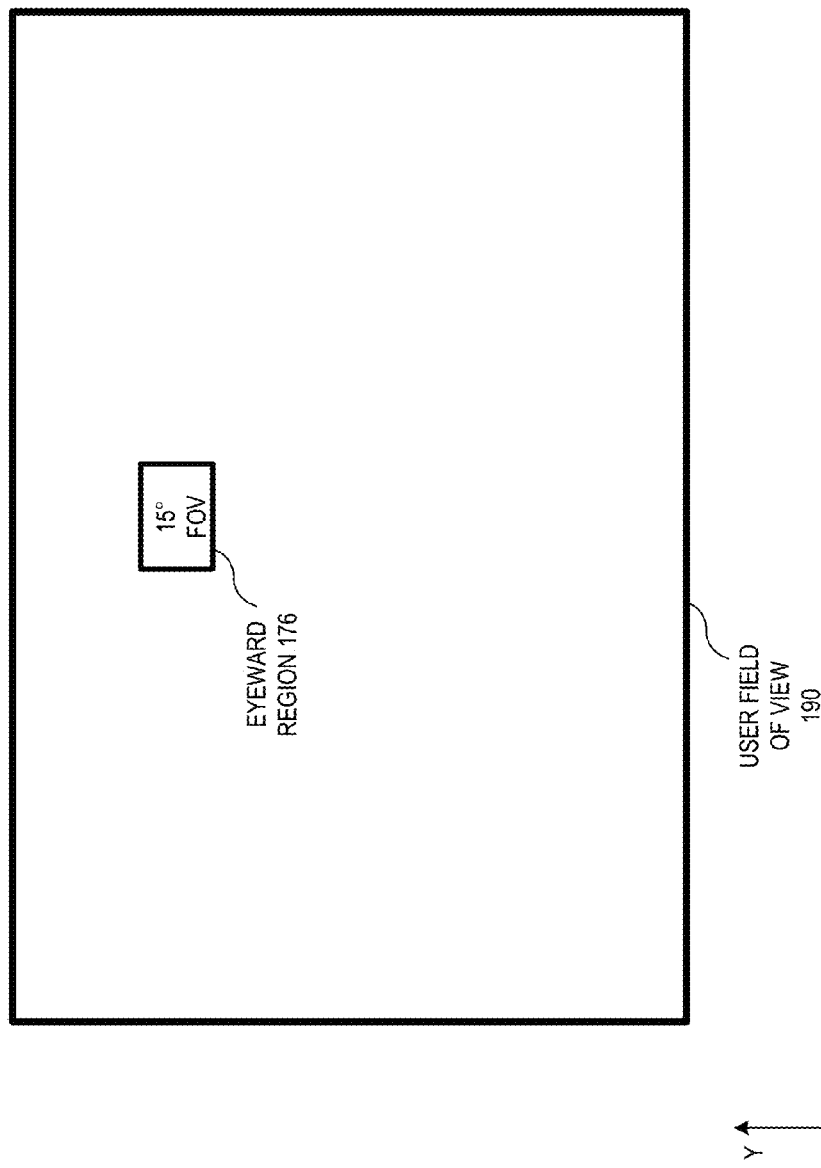
FIG. 1B illustrates a computer generated image directed into an eyeward-region of an estimated field of view of a user of an optical combiner.

Embodiments of optical combiners and Head Mounted Displays ("HMDs") that include spatially multiplexed lens are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1A depicts a top cross-section view of an example optical combiner 100 including a display module 105, a light relay 165, a beam splitter 131, and an end reflector 183. Optical combiner 100 may be integrated in a head gear to form a head mounted display ("HMD"). Display module 105 projects computer generated images ("CGI"). Display module 105 may be implemented by a light emitting diode ("LED") array, an organic LED ("OLED") array, a quantum dot array, a laser scanner, or otherwise. Display module 105 may also be implemented by a light source (e.g. laser, LED, or bulb) backlighting an LCD display or a liquid crystal on silicon ("LCOS") panel reflecting a light source. Display module 105 may be considered a "micro-display." End reflector 183 may be a concave mirror.

In operation, display module 105 launches display light (which may be CGI light) along a forward path 180 toward end reflector 183. Light relay 165 may have a transparent structure to permit most or a large part of the display light to pass through along forward path 180. Light relay 165 may be fabricated of a solid transparent material (e.g., glass, quartz, acrylic, clear plastic, PMMA, ZEONEX—E48R, etc.) or be implemented as a solid housing having an inner air gap through which the display light passes. Light relay 165 may operate to protect the optical path, but may not necessarily use total internal reflection ("TIR") to guide or confine the display light.

Along forward path 180, display light encounters beam splitter 131. Beam splitter 131 reflects a first portion of the display light towards the external scene-side of optical combiner 100 and passes a second portion of the display light. Beam splitter 131 may be a 45 degree 50/50 non-polarizing beam splitter, meaning it reflects 50 percent of light and passes the other 50 percent of light. The display light passed by beam splitter 131 continues along forward path 180 and end reflector 183 reflects back the display light along a reverse path 185. The display light along reverse path 185 encounters beam splitter 131, which reflects a portion of the display light along reverse path 185 toward an eye-ward side of optical combiner 100. The illustrated embodiment of FIG. 1A allows the display light launched by display module 105 to be projected into eye 160 of a user, which is how a computer generated image is directed into eyeward-region 176. In addition to directing images into eyeward-region 176, optical combiner 100 may also allow at least a portion of external scene light 155 to reach eye 160 (after a portion is reflected by beam splitter 131).

FIG. 1B illustrates a computer generated image directed into eyeward-region 176 which is in an estimated field of view ("FOV") 190 of a user of optical combiner 100. In FIG. 1B, FOV 190 and eyeward-region 176 are defined within an x-y plane. A typical user of an HMD may have a natural field of view ("FOV") of nearly 180° horizontally. An image presented within eyeward-region 176 from optical combiner 100 may only be presented to the user in 15° (horizontally) of the user's total FOV and only within the x-y plane. In certain contexts, it would be advantageous to present images and information to a user in different depths (z-axis) of FOV 190 and in more than 15° (horizontally) of the user's total FOV.

Figure 2A:
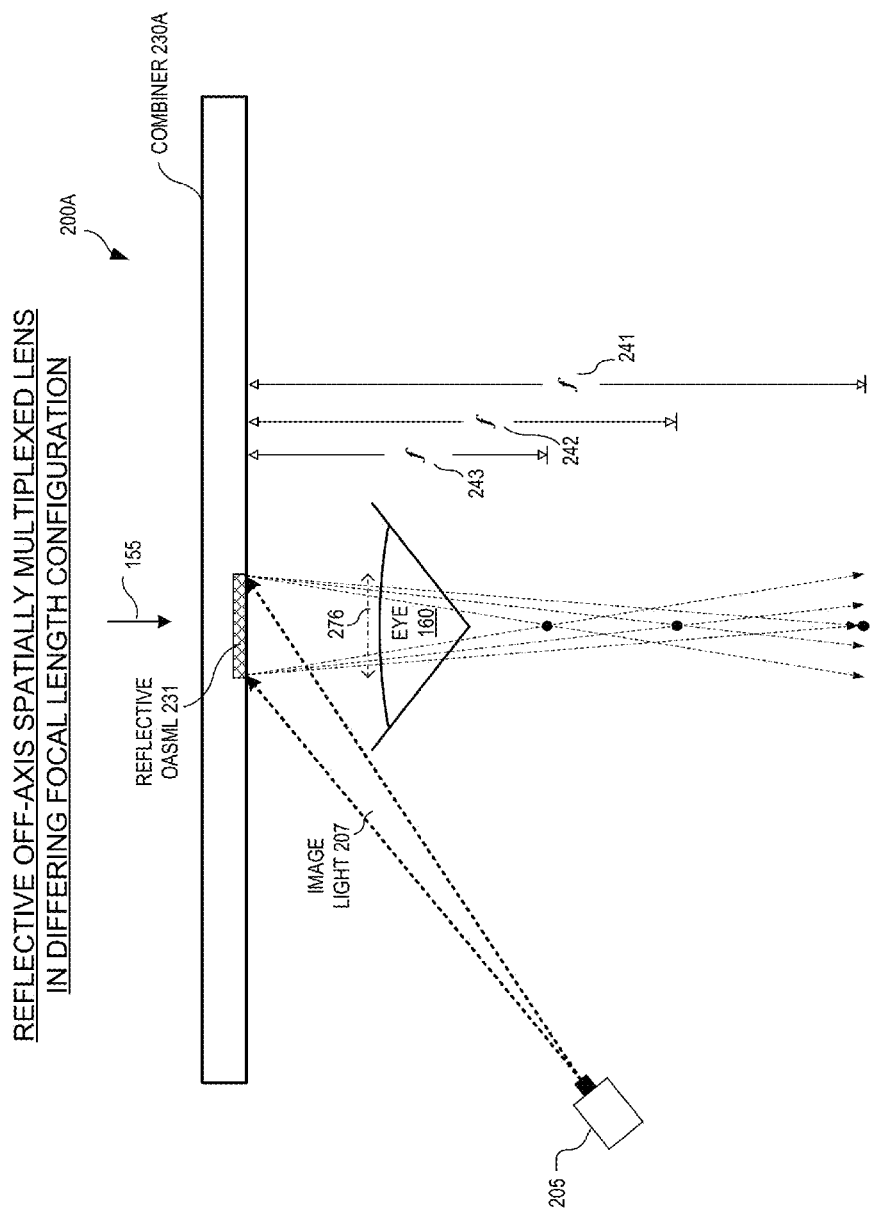
FIG. 2A illustrates an optical combiner including an example reflective off-axis spatially multiplexed lens ("OASML") reflecting image light toward an eyeward-region, in accordance with an embodiment of the disclosure.

FIG. 2A illustrates an optical system 200A that includes a display module 205 and an optical combiner 230A that includes an example reflective off-axis spatially multiplexed lens ("OASML") 231, in accordance with an embodiment of the disclosure. Combiner 230A may be integrated as an eyepiece in a monocular or binocular HMD. Combiner 230A may be generally transparent and fabricated of a solid transparent material (e.g., glass, quartz, acrylic, clear plastic, PMMA, ZEONEX—E48R, etc.). The generally transparency of combiner 230A allows external scene light 155 to propagate to eye 160 to allow a user to view her environment when combiner 230A is in front of a user's eye 160. Display module 205 may be implemented by a light emitting diode ("LED") array, an organic LED ("OLED") array, a quantum dot array, a laser scanner, or otherwise. Display module 205 may also be implemented by a light source (e.g. laser, LED, or bulb) backlighting an LCD display or a liquid crystal on silicon ("LCOS") panel reflecting a light source. Display module 205 may be considered a "micro-display."

To present images to a user, display module 205 projects image light 207 (that may include computer generated image(s)) toward reflective OASML 231. OASML 231 includes three sub-lenses that are spatially multiplexed as OASML 231, in the illustrated embodiment. However, a spatially multiplexed lens may incorporate just two (or more) sub-lenses. Spatially multiplexed lenses are used in industry, for example, in the optical disk reading contexts, to give an optical reading head the ability to read both CD and DVD formats.

Each of the three sub-lenses in OASML 231 direct the image light toward eyeward-region 276. The first sub-lens in the illustrated OASML 231 has a first focal length 241 and is configured to receive image light 207 and direct a first portion of the image light 207 toward eyeward-region 276. Similarly, the second sub-lens in OASML 231 has a second focal length 242 and is configured to receive image light 207 and direct a second portion of the image light 207 toward eyeward-region 276. The third sub-lens in OASML 231 has a third focal length 243 and is configured to receive image light 207 and direct a third portion of image light 207 toward eyeward-region 276. The effect of choosing different focal lengths (e.g. 241, 242, and 243) for each sub-lens allows optical system 200A to present three images with associated depth in the same eyeward-region 276. The focal point (illustrated as black filled circles) of each sub-lens may be behind eye 160 in order to produce virtual images that a viewer's eye 160 can focus on. Those skilled in the art will appreciate that even though the focal points of the various sub-lenses are illustrated behind eye 160, the lens in eye 160 will further focus images in image light 207 onto the back of the eye so they will be in focus for the user.

FIG. 2C illustrates computer generated images directed into different depths of the same eye-ward-region 276 by an OASML, in accordance with an embodiment of the disclosure. Eyeward-region 276 is within a user's FOV 290. The first sub-lens of OASML 231 focuses a first color (e.g. red) of the image light 207 as a first image at a first depth 291. In FIG. 2C, the first image is illustrated as the letter "A." The second sub-lens of OASML 231 focuses a second color (e.g. green) of the image light 207 as a second image at a second depth 292. The second image is illustrated as the letter "B." The third sub-lens of OASML 231 focuses a third color (e.g. blue) of the image light 207 as a third image at a third depth 293. The third image is illustrated as the letter "C." The first, second, and third images are focused in the same x-y coordinates of eyeward-region 276, but they have different depths (z-axis). The virtual images (e.g. first, second, and third images) in image light 207 may be located in the range of a few meters in front of the viewer's eye 160, depending on what sub-lens is presenting the image. In one example, the first image is presented at one meter, the second image is presented at two meters, and the third image is presented at three meters. A user may perceive a superimposed combination of the first, second, and third images, due to their different depths.

Returning to FIG. 2A, reflective OASML 231 may use a variety of lensing configurations. For example, OASML 231 may use purely reflective lensing, purely diffractive lensing, or a combination of both. In a purely reflective lensing configuration, each sub-lens that is multiplexed into OASML 231 utilizes mirror curvatures that are coated with a color filter that reflects a specific color (in a wavelength range) but substantially absorbs or passes other colors in the visible spectrum. Dichroic filters are used to allow each sub-lens to select for color, in some embodiments. The mirror curvatures may be 50/50 mirrors that pass 50% of incident light while reflecting the other 50% of incident light. This allows a portion of external scene light 155 to reach eye 160. The curvature of the mirrors that are multiplexed together define the optical power corresponding with the focal lengths 241, 242, and 243, while the color filters coating the mirrors sections act as color selectors. In one embodiment, the first sub-lens is coated with a color filter that reflects red light, the second sub-lens is coated with a color filter that reflects green light, and the third sub-lens is coated with a color filter that reflects blue light.

FIGS. 4A-4G illustrate a conceptual process of fabricating an example OASML that includes two sub-lenses having different focal lengths, the same optical axis and the same aperture, in accordance with an embodiment of the disclosure. Although FIGS. 4A-4G illustrate spatially multiplexing two sub-lenses for descriptive purposes, those skilled in the art will understand that the techniques and concepts of FIGS. 4A-4G could be applied to fabricate spatially multiplexed lens having three, four, or more sub-lenses multiplexed together.

Figure 4B:
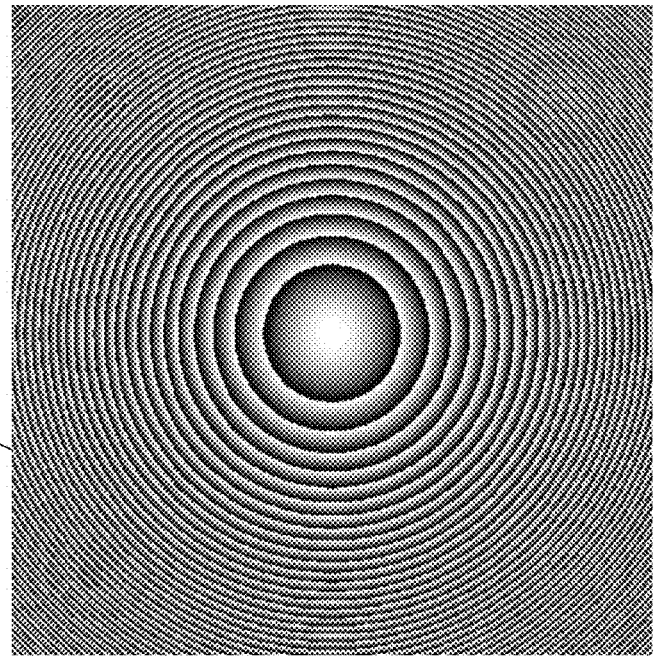
Figure 4A:
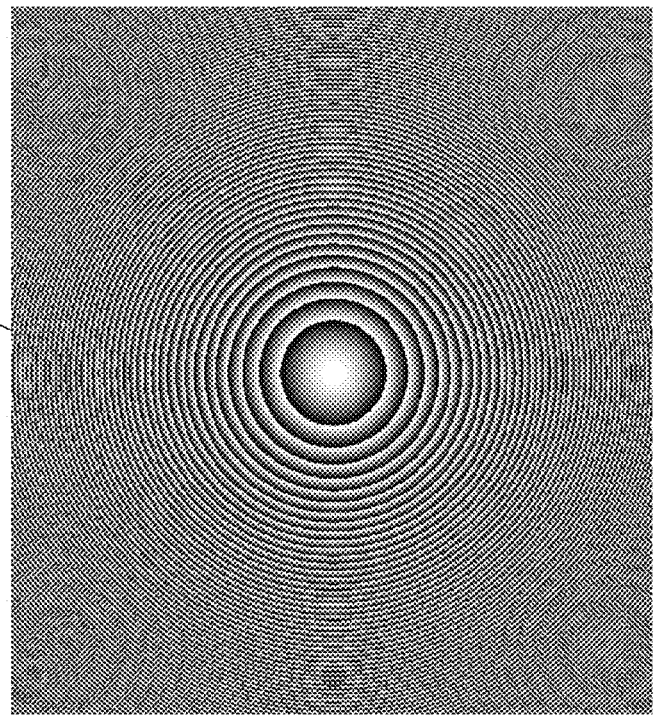

FIG. 4A shows a first lens 421 and FIG. 4B shows a second lens 422. First lens 421 has a shorter focal length than second lens 422. First lens 421 and second lens 422 can be spatially multiplexed in a variety of different configurations. For example, first lens 421 and second lens 422 could be spatially multiplexed in a checkerboard pattern at a microscopic level. In a checkerboard pattern multiplexing, the optical properties of first lens 421 are fabricated on what would be the black spaces on the checkerboard and the optical properties of second lens 422 are fabricated on what would be the white spaces on the checkerboard. Of course, the checkboard pattern may include many more spaces than an actual 8×8 gaming checkerboard. In another example, first lens 421 and second lens 422 could be spatially multiplexed in an expanding ring pattern where the optical properties of first lens 421 are and second lens 422 are alternately fabricated into expanding rings that incrementally expand outward. The expanding rings pattern may take the form of a bulls-eye pattern when the rings expand as concentric circles. In addition to the checkerboard and expanding rings examples, a dartboard pattern may be used for spatially multiplexing first lens 421 and second lens 422. A dartboard pattern may offer advantages with regard to reducing optical artifacts compared to the checkerboard and expanding rings patterns, as the same numerical aperture as well as the radial and angular components of each lens can be retained.

Figures 4C, 4D:
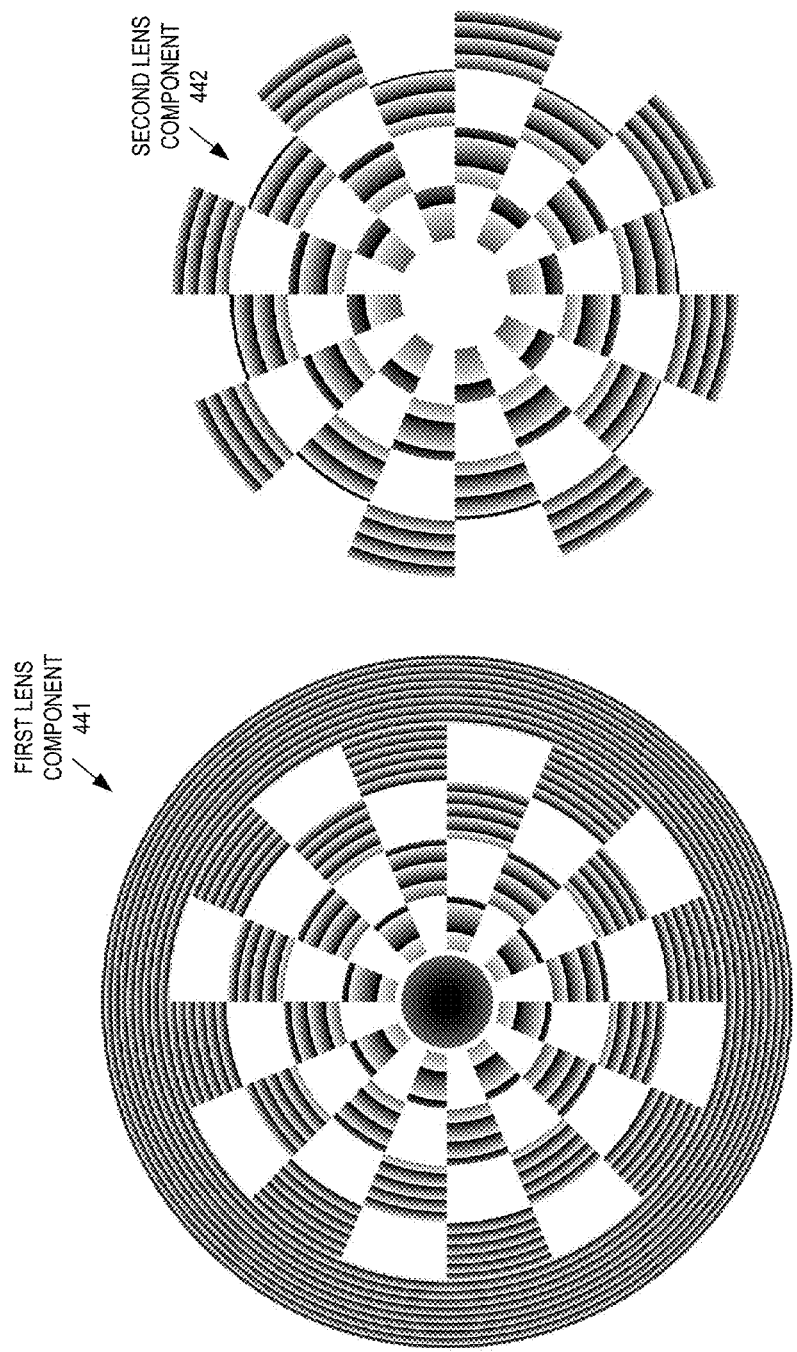
Figure 4G:
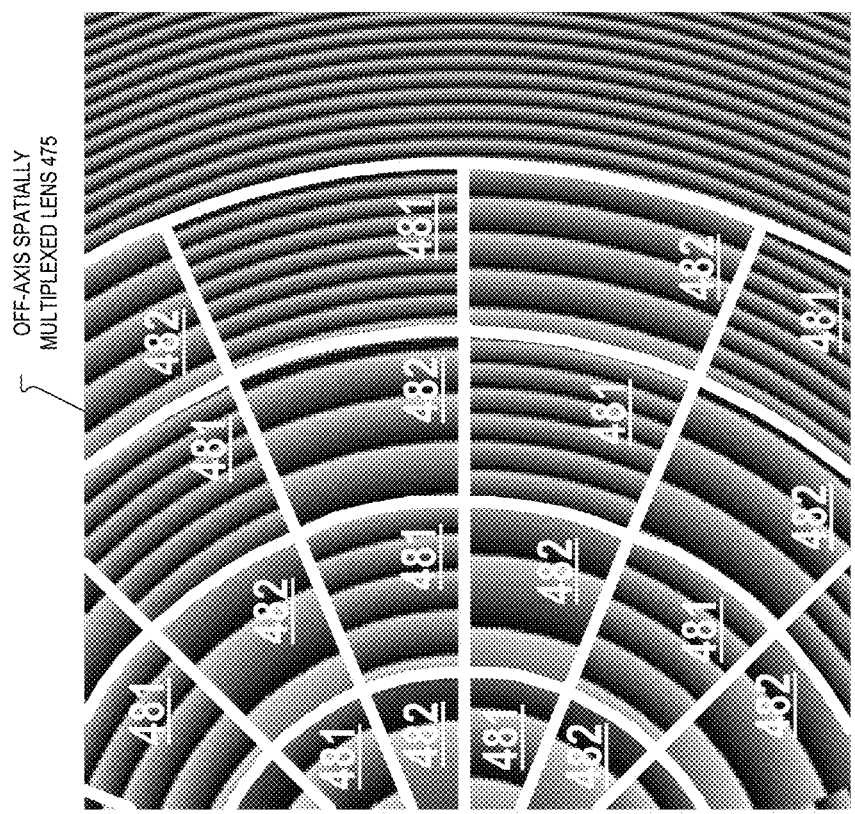

FIG. 4C shows a first lens component 441 which is a result of first lens 421 having portion removed in a dartboard pattern. FIG. 4D shows a second lens component 442, which is a result of second lens 422 having portions removed in a dartboard pattern that will complement the portions of first lens 421 that have been removed. In other words, second lens component 442 can geometrically be "dropped in" to first lens component 441 to form a spatially multiplexed lens. FIG. 4E shows spatially multiplexed lens 450 that includes first lens component 441 combined with second lens component 442. Thus, spatially multiplexed lens 450 includes a first sub-lens (first lens component 441) and a second sub-lens (second lens component 442) that are multiplexed together along a common optical axis in a dartboard pattern. FIG. 4F shows an off-axis spatially multiplexed lens 475 which is an off-axis portion of spatially multiplexed lens 450. FIG. 4G illustrates that OASML 475 includes a first sub-lens having first zones 481 and a second sub-lens having second zones 482. All of the first zones 481 include the optical characteristics of the first sub-lens and all of the second zones 482 include the optical characteristics of the second sub-lens.

It is appreciated that FIGS. 4A-4F are a conceptual progression of the design process for a spatially multiplexed lens and that the off-axis spatially multiplexed lens 475 illustrated in FIG. 4F could be fabricated directly by designing the appropriate lensing patterns in software prior to translating the pattern to a physical lens medium. Fabricating the off-axis spatially multiplexed lenses may be accomplished using lithography, diamond turning with CNC machine-tools, press molding into negative impressions of the off-axis multiplexed lenses, or a combination of these fabrication techniques. Further information for optics fabrication techniques that can be used to produce spatially multiplexed lenses is described in Chapters 12-14 of Applied Digital Optics: From Micro-optics to Nanophotonics. Kress, Bernard C. and Patrick Meyrueis. Applied Digital Optics: From Micro-optics to Nanophotonics. John Wiley & Sons, Ltd, 2009.

The zones (481, 482) of OASML 475 could be coated with the appropriate color filters and used as reflective OASML 231, in FIG. 2A. Although in that case, reflective OASML 231 would only have two sub-lenses and two focal lengths rather than the three illustrated. However, given the benefit of this disclosure, those skilled in the art could fabricate an OASML having three sub-lenses selective to three different colors and having three different focal lengths, as illustrated in FIG. 2A. It is appreciated that when color filters are included in a given sub-lens, those color filters are applied to the zones that are included in that sub-lens. For example, in FIG. 4G, first zones 481 are coated with a first color filter if the first sub-lens includes color filter coatings. It is also appreciated that when reflective, refractive, and/or diffractive optical properties are associated with a given sub-lens of this disclosure, the zones of those sub-lens includes those optical properties.

In addition to a purely reflective OASML 231 (with appropriate color filter coatings), OASML 231 may be made using a purely diffractive configuration. In a purely diffractive configuration, each sub-lens in OASML 231 utilizes holographic structures to give each sub-lens color selectivity and optical power corresponding with its focal length.

As is known in the art, holographic optics can be designed to reflect specific wavelengths of light while passing other wavelengths of light (known as the Bragg selectivity in volume holograms, both in spectral or angular aspects). In addition, holographic optics can be designed to reflect specific wavelengths at different orders of diffraction to manipulate the angle that the light is reflected (spectral aspect of the Bragg selectivity). Reflecting the specific wavelengths at particular orders of diffraction can facilitate directing the specific wavelength into eye 160. To accomplish these reflections of specific wavelengths, the holographic optics are angle-tuned to a known angle and optical functionality, such as a lensing or collimation functionality. In other words, to design holographic optics, a designer must consider the desired light color to be reflected, the angle the desired light color will strike the holographic optic, and the required order of diffraction (if any) to direct the desired light color to the desired location. In addition to reflecting specific wavelengths, those skilled in the art understand that lensing functionality (with results similar to refractive lenses) can be designed into holographic optics. Holographic optics may have the advantage over refractive/reflective/catadioptric optics that they can have various optical functionalities depending on how they are illuminated (e.g. angle of incidence wavelength, polarization). These unique properties are summarized in the well know Bragg selectivity of volume holograms.

Using conventional techniques that include creating interference patterns between a reference beam and a second beam, holograms may be "written" or "recorded" into photoactive holographic mediums such as silver-halide, photopolymer, dichromated gelatins, or otherwise. The interference patterns may be calculated in software before translating them into the holographic medium. The resulting holographic optics may be designed to be transmissive or reflective. Holographic mediums are available from DuPont™ and other companies.

In a purely diffractive OASML 231 of FIG. 2A, each multiplexed sub-lens would have their own holographic structures designed to focus (at its focal length) and reflect a specific color (using Bragg selectivity principles) of image light 207 from display module 205. The holographic structures in each sub-lens could be tuned to focus and reflect image light 207 based on the specific angle of display module 205 relative to reflective OASML 231. In one embodiment, display module 205 projects narrow spectrums of red, green, and blue light as image light 207. The first sub-lens, second sub-lens, and third sub-lens may be configured/tuned to only "act" on the narrow spectrums of the red, green, and blue light by reflecting the respective narrow spectrums when received from the angle of display module 205.

A reflective/diffractive combination lens is possible as reflective OASML 231. In a reflective/diffractive combination lens, the curvatures of mirrored portions of each sub-lens provides the optical power for focusing, while a diffractive grating provides the color selectivity of the sub-lens. Of the different optical configurations of reflective OASML 231, the purely diffractive (hologram) configuration may have the advantage of having the least impact on external scene light 155 because the hologram only "acts" on light received from a specific angle and at a certain wavelength. Hence, if image light 207 is constrained to narrow spectrums of red, green, and blue light, the holograms don't necessarily "act" on incoming external scene light 155 because it is not received at the proper angle and wavelength, as compared to image light 207. In contrast, a reflective solution (which includes mirroring and possibly color filters) will block a significant amount of incoming external scene light 155 from reaching eye 160.

FIG. 2B illustrates an optical system 200B that includes an optical combiner 230B including a transmissive OASML 232, in accordance with an embodiment of the disclosure. Combiner 230B may be integrated as an eyepiece in a monocular or binocular HMD. Similarly to combiner 230A, combiner 230B may be generally transparent to allow external scene light 155 to propagate to eye 160 to allow a user to view her environment when combiner 230B is in front of a user's eye 160.

To present images to a user, display module 205 projects image light 207 (that may include computer generated image(s)) toward transmissive OASML 232. OASML 232 includes three sub-lenses that are spatially multiplexed as OASML 232, in the illustrated embodiment. Of course, transmissive OASML 232 may incorporate two (or more) sub-lenses.

Each of the three sub-lenses in OASML 232 direct the image light 207 toward eyeward-region 276. The first sub-lens in the illustrated OASML 232 has a first focal length 241 and is configured to receive image light 207 and direct a first portion (e.g. red light) of the image light 207 toward eyeward-region 276. Similarly, the second sub-lens in OASML 232 has a second focal length 242 and is configured to receive image light 207 and direct a second portion (e.g. green light) of the image light 207 toward eyeward-region 276. The third sub-lens in OASML 232 has a third focal length 243 and is configured to receive image light 207 and direct a third portion (e.g. blue light) of image light 207 toward eyeward-region 276. The effect of choosing different focal lengths (e.g. 241, 242, and 243) for each sub-lens allows optical system 200B to present three images with associated depth in the same eyeward-region 276. The focal point (illustrated as black filled circles) of each sub-lens may be behind eye 160 in order to produce virtual images that a viewer's eye 160 can focus on. The virtual images may be located in the range of a few meters in front of the viewer's eye 160. Therefore, optical system 200B is capable of generating the "A," "B," and "C" images at different depths 291, 292, 293, as illustrated in FIG. 2C.

Transmissive OASML 232 may use a variety of lensing configurations. For example, OASML 232 may use purely refractive lensing, purely diffractive lensing, or a combination of both. In a purely refractive lensing configuration, each sub-lens that is multiplexed into OASML 232 has transparent refractive zones (e.g. zones 481, 482) that are coated with a color filter that passes a specific color (in a wavelength range) but substantially absorbs or reflects other colors in the visible spectrum. The transparent refractive zones of each sub-lens that are multiplexed together define the optical power corresponding with the focal lengths 241, 242, and 243, while the color filters coating the transparent refractive zones act as color selectors. In one embodiment, the first sub-lens is coated with a color filter that passes red light, the second sub-lens is coated with a color filter that passes green light, and the third sub-lens is coated with a color filter that passes blue light.

In a purely diffractive configuration of transmissive OASML 232, each sub-lens in OASML utilizes holographic structures to give each sub-lens color selectivity and optical power corresponding with its focal length. In a diffractive/refractive combination configuration of transmissive OASML 232, a refractive component of each sub-lens is used to provide optical power, while a diffractive grating overlaying the refractive component acts as a color selector.

Transmissive OASML 232 may be fabricated using the same concepts explained in association with reflective OASML 231 and FIGS. 4A-4F. However, instead of defining mirror curvatures of the sub-lenses to reflect image light 207 at a specific optical power, a transparent refractive medium is defined to focus and direct image light 207 toward eyeward-region 276 in a purely refractive lensing configuration or a refractive/diffractive lensing configuration. In the purely diffractive configuration of OASML 232, each sub-lens includes holographic structures strategically placed into the appropriate zones (e.g. 481, 482) that define the optical power and color selection of the particular sub-lens.

FIG. 3A illustrates an optical combiner 330A including an example reflective OASML 331 reflecting portions of image light 207 toward multiple eyeward-regions 375, 376, and 377, in accordance with an embodiment of the disclosure. Optical combiner 330A may be integrated as an eyepiece in a monocular or binocular HMD. Similarly to combiners 230A and 230B, combiner 330A may be generally transparent to allow external scene light 155 to propagate to eye 160 to allow a user to view her environment when combiner 330A is in front of a user's eye 160.

To present images to a user, display module 205 projects image light 207 (that may include computer generated image(s)) toward reflective OASML 331. OASML 331 includes three sub-lenses that are spatially multiplexed as OASML 331, in the illustrated embodiment. However, a spatially multiplexed lens may incorporate just two (or more) sub-lenses.

In the illustrated embodiment, each of the three sub-lenses in OASML 331 directs a portion of image light 207 toward its corresponding eyeward-region. The first sub-lens in the illustrated OASML 331 is configured to receive image light 207 and direct a first portion (e.g. red light) of the image light 207 toward eyeward-region 375. Similarly, the second sub-lens in OASML 331 is configured to receive image light 207 and direct a second portion (e.g. green light) of the image light 207 toward eyeward-region 376. The third sub-lens in OASML 331 is configured to receive image light 207 and direct a third portion (e.g. blue light) of image light 207 toward eyeward-region 377. Each of the first, second, and third sub-lenses has a different amount of off-axis so that, for example, the red light of image light 207 is directed to eyeward-region 375, the green light of image light 207 is directed to eyeward-region 376, and the blue light of image light 207 is directed to eyeward-region 377.

In the illustrated embodiment, the first, second, and third sub-lenses are configured to substantially collimate their portion of image light 207 so that a user is able to focus on the images presented in each eyeward-region 375, 376, and 377. In one embodiment, the virtual images directed to each eyeward-region are located in the range of a few meters in front of the viewer's eye 160. In one embodiment, each of the first, second, and third sub-lenses are configured to substantially collimate their portion of image light 207 so that each image is perceived to be at approximately optical infinity. In that regard, each of the first, second, and third sub-lenses may have the same focal length. However, in some embodiments, the focal length of each sub-lens may differ to present the image in the eyeward-regions at different perceived distances from eye 160.

Reflective OASML 331 may use a variety of lensing configurations. For example, OASML 331 may use purely reflective lensing, purely diffractive lensing, or a combination of both. In a purely reflective lensing configuration, mirror curvatures define each sub-lens that is multiplexed into OASML 331 in zones (e.g. zones 481, 482) that are also coated with a color filter that reflects a specific color (in a wavelength range) but substantially absorbs or passes other colors in the visible spectrum. The mirror curvatures (in the zones of each sub-lens) also define the reflective optical power to focus (e.g. collimate) its portion of image light 207 for a user to view. In one embodiment, the first sub-lens is coated with a color filter that reflects red light, the second sub-lens is coated with a color filter that reflects green light, and the third sub-lens is coated with a color filter that reflects blue light. The mirror curvatures in a purely reflective lensing configuration may be 50/50 mirrors that pass 50% of incident light while reflecting the other 50% of incident light. This allows a portion of external scene light 155 to reach eye 160.

In a purely diffractive configuration of reflective OASML 331, each sub-lens in OASML utilizes holographic structures to give each sub-lens color selectivity and optical power to focus (e.g. collimate) its portion of image light 207 for a user to view. In a diffractive/reflective combination configuration of reflective OASML 331, a reflective component of each sub-lens is used to provide optical power, while a diffractive grating overlaying the reflective component acts as a color selector.

FIG. 3B illustrates an optical combiner 330B including a transmissive OASML 332, in accordance with an embodiment of the disclosure. Combiner 330B may be integrated as an eyepiece in a monocular or binocular HMD. Similarly to combiners 230A, 230B, and 330A, combiner 330B may be generally transparent to allow external scene light 155 to propagate to eye 160 to allow a user to view her environment when combiner 330B is in front of a user's eye 160.

OASML 332 is similar to OASML 331 except that it works in transmission rather than reflection. To present images to a user, display module 205 projects image light 207 (that may include computer generated image(s)) toward transmissive OASML 332. OASML 332 includes three sub-lenses that are spatially multiplexed as OASML 332, in the illustrated embodiment.

Each of the three sub-lenses in OASML 332 directs the image light 207 in an eyeward direction. The first sub-lens in the illustrated OASML 332 is configured to receive image light 207 and direct a first portion (e.g. red light) of the image light 207 toward eyeward-region 375. Similarly, the second sub-lens in OASML 332 is configured to receive image light 207 and direct a second portion (e.g. green light) of the image light 207 toward eyeward-region 376. The third sub-lens in OASML 332 is configured to receive image light 207 and direct a third portion (e.g. blue light) of image light 207 toward eyeward-region 377. Each of the first, second, and third sub-lenses has a different amount of off-axis so that, for example, the red light of image light 207 is directed to eyeward-region 375, the green light of image light 207 is directed to eyeward-region 376, and the blue light of image light 207 is directed to eyeward-region 377.

Transmissive OASML 332 may use a variety of lensing configurations. For example, OASML 332 may use purely refractive lensing, purely diffractive lensing, or a combination of both. In a purely refractive lensing configuration, each sub-lens that is multiplexed into OASML 332 has transparent refractive zones (e.g. zones 481, 482) that are coated with a color filter that passes a specific color (in a wavelength range) but substantially absorbs or reflects other colors in the visible spectrum. The transparent refractive zones of each sub-lens that are multiplexed together define the optical power to focus (e.g. collimate) its portion of image light 207 for a user to view, while the color filters coating the transparent refractive zones act as color selectors. In one embodiment, the first sub-lens is coated with a color filter that passes red light, the second sub-lens is coated with a color filter that passes green light, and the third sub-lens is coated with a color filter that passes blue light.

In a purely diffractive configuration of transmissive OASML 332, each sub-lens in OASML utilizes holographic structures to give each sub-lens color selectivity and optical power to focus (e.g. collimate) its portion of image light 207 for a user to view. In a diffractive/refractive combination configuration of transmissive OASML 332, a refractive component of each sub-lens is used to provide optical power, while a diffractive grating overlaying the refractive component acts as a color selector.

Reflective OASML 331 and transmissive OASML 332 may be fabricated using the same concepts explained in association with OASML 231 and FIGS. 4A-4F. However, the optical properties described in association with OASML 331 or OASML 332 would replace the optical properties of OASML 231.

Of the different optical configurations of reflective OASML 331 and transmissive OASML 332, the purely diffractive (hologram) configurations may have the advantage of having the least impact on external scene light 155 because the hologram only "acts" on light received from a specific angle and at a certain wavelength. Hence, if image light 207 is constrained to narrow spectrums of red, green, and blue light, the holograms don't necessarily "act" on incoming external scene light 155 because it is not received at the proper angle and wavelength, as compared to image light 207. In contrast, a reflective solution (which includes mirroring and possibly color filters) will block a significant amount of incoming external scene light 155 from reaching eye 160.

Figure 3C:
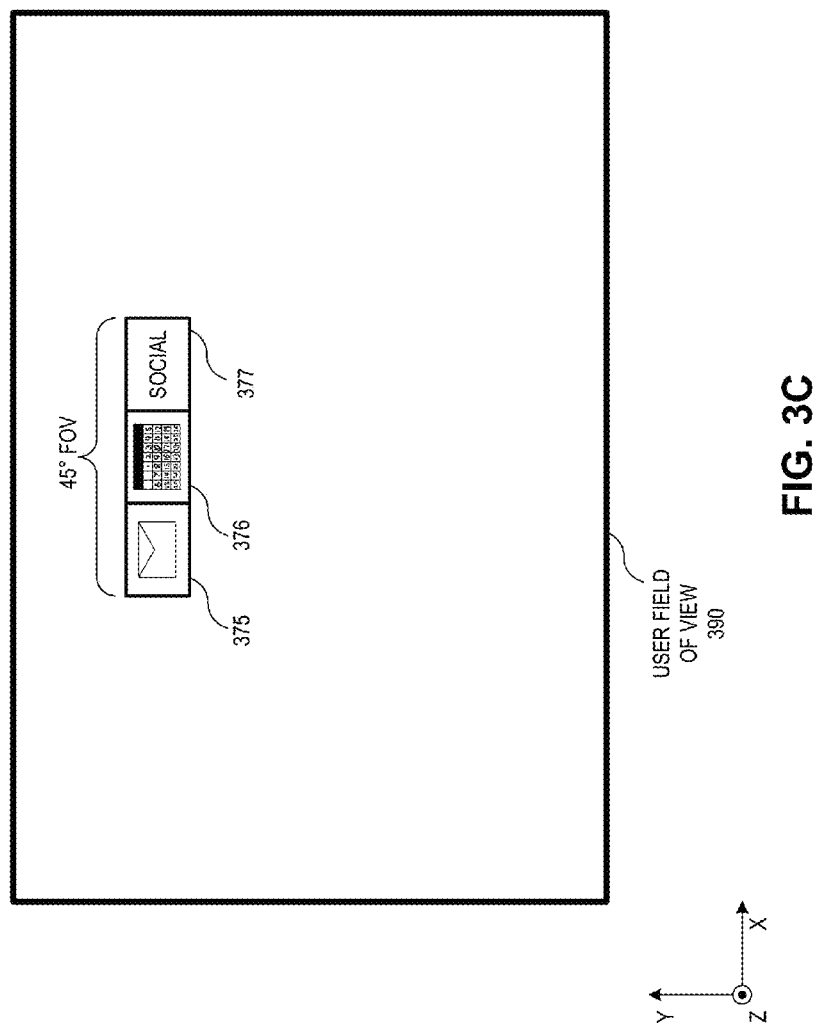
FIG. 3C illustrates computer generated images directed into different eyeward-regions that are stitched together, in accordance with an embodiment of the disclosure.

FIG. 3C illustrates computer generated images directed into different eyeward-regions 375, 376, and 377 that are stitched together, in accordance with an embodiment of the disclosure. Eyeward-regions 375, 376, and 377 are within a user's FOV 390. The first sub-lens of OASML 331/332 directs a first portion (e.g. red light) of the image light 207 to first eyeward-region 375. In FIG. 3C, the first image in eyeward-region 375 is illustrated as an envelope. The second sub-lens of OASML 331/332 directs a second portion (e.g. green light) of the image light 207 to second eyeward-region 376. The second image in eyeward-region 376 is illustrated as a monthly calendar. The third sub-lens of OASML 331/332 directs a third portion (e.g. blue light) of the image light 207 to third eyeward-region 377. The third image in eyeward-region 377 is illustrated as the word "SOCIAL." To render the first image in red, the second image in green, and the fourth image in blue, the display module 205 may embed the first image, the second, image, and the third image in red/green/blue components of an integrated image generated by display module 205. Alternatively, display module 205 could time-multiplex red, green, and blue components of image light 207 at a refresh rate (e.g. 120 Hz) that is imperceptible to eye 160.

The first, second, and third images are stitched together as a contiguous image having a 45° FOV, which increases the 15° FOV illustrated in FIG. 1B. Furthermore, the FOV is increased without necessarily requiring an increase in the size of display module 205 or shortening the focal length of the optical combiner, which is prone to create a "bug eye" aesthetic because of the curvature requirements of the combiner lens. Instead, the amount of off-axis in each of the first, second, and third sub-lenses is designed to create the contiguous image with a 45° FOV. It is understood that a user's eye 160 may look straight ahead to view the second image in eyeward-region 376, slightly to the left to view eyeward-region 375, and slightly to the right to view eyeward-region 377, in some embodiments. In the illustrated embodiment, the first, second, and third images are all at the same depth (z-axis) because their corresponding sub-lenses have the same focal length. However, it is appreciated that adjusting the focal length of the first, second, and third sub-lenses in OASML 331/332 will have corresponding changes in the depth of image in FOV 390.

Figure 3D:
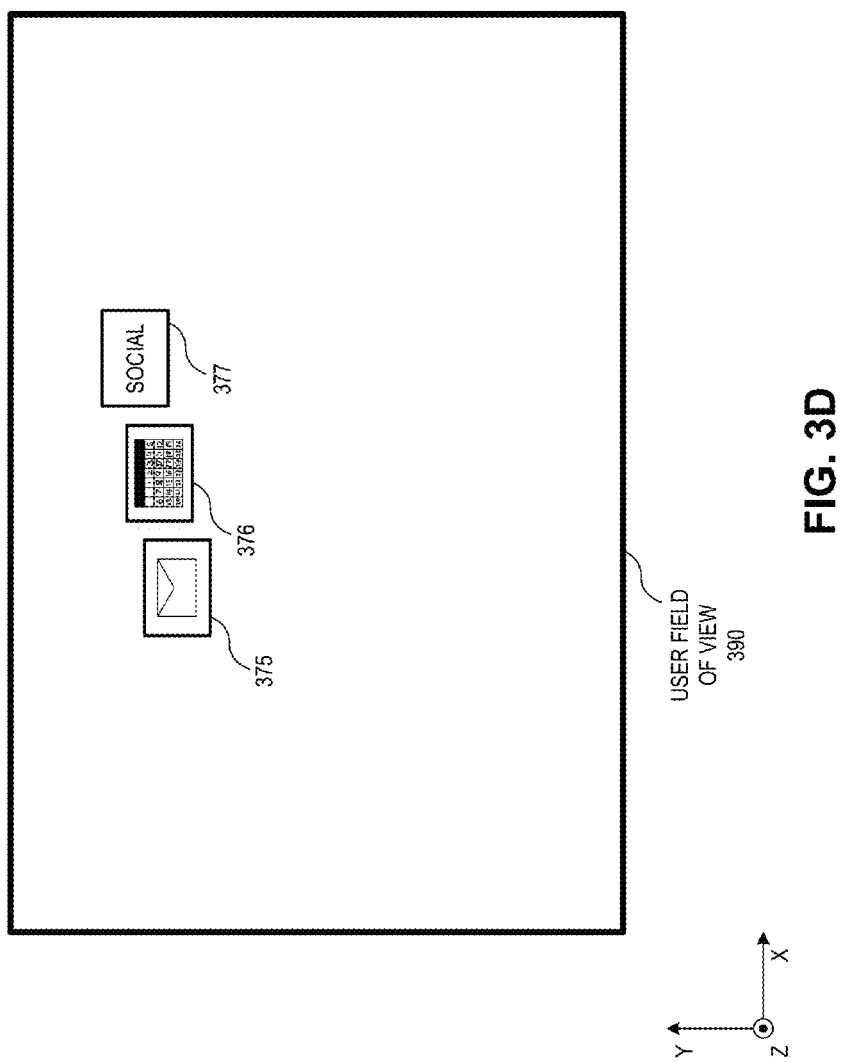
FIG. 3D illustrates computer generated images directed into different eyeward-regions that are not stitched together, in accordance with an embodiment of the disclosure.

FIG. 3D illustrates computer generated images directed into different eyeward-regions 375, 376, and 377 that are not stitched together, in accordance with an embodiment of the disclosure. Similarly to FIG. 3C, eyeward-regions 375, 376, and 377 are within a user's FOV 390. However, in FIG. 3D the first, second, and third images are not stitched together as a contiguous image. However, the user's FOV is still extended farther than the 15° FOV illustrated in FIG. 1B. The amount of off-axis in each of the first, second, and third sub-lenses is designed to create the noncontiguous images, in FIG. 3D. It is appreciated that adjusting the off-axis amount of the different sub-lenses can move the first, second, and third images within the users FOV 390, as desired. In the illustrated embodiment, the first, second, and third images are all at the same depth (z-axis) because their corresponding sub-lenses have the same focal length. However, it is appreciated that adjusting the focal length of the first, second, and third sub-lenses in OASML 331/332 will have corresponding changes in the depth of image in FOV 390.

Figure 5:
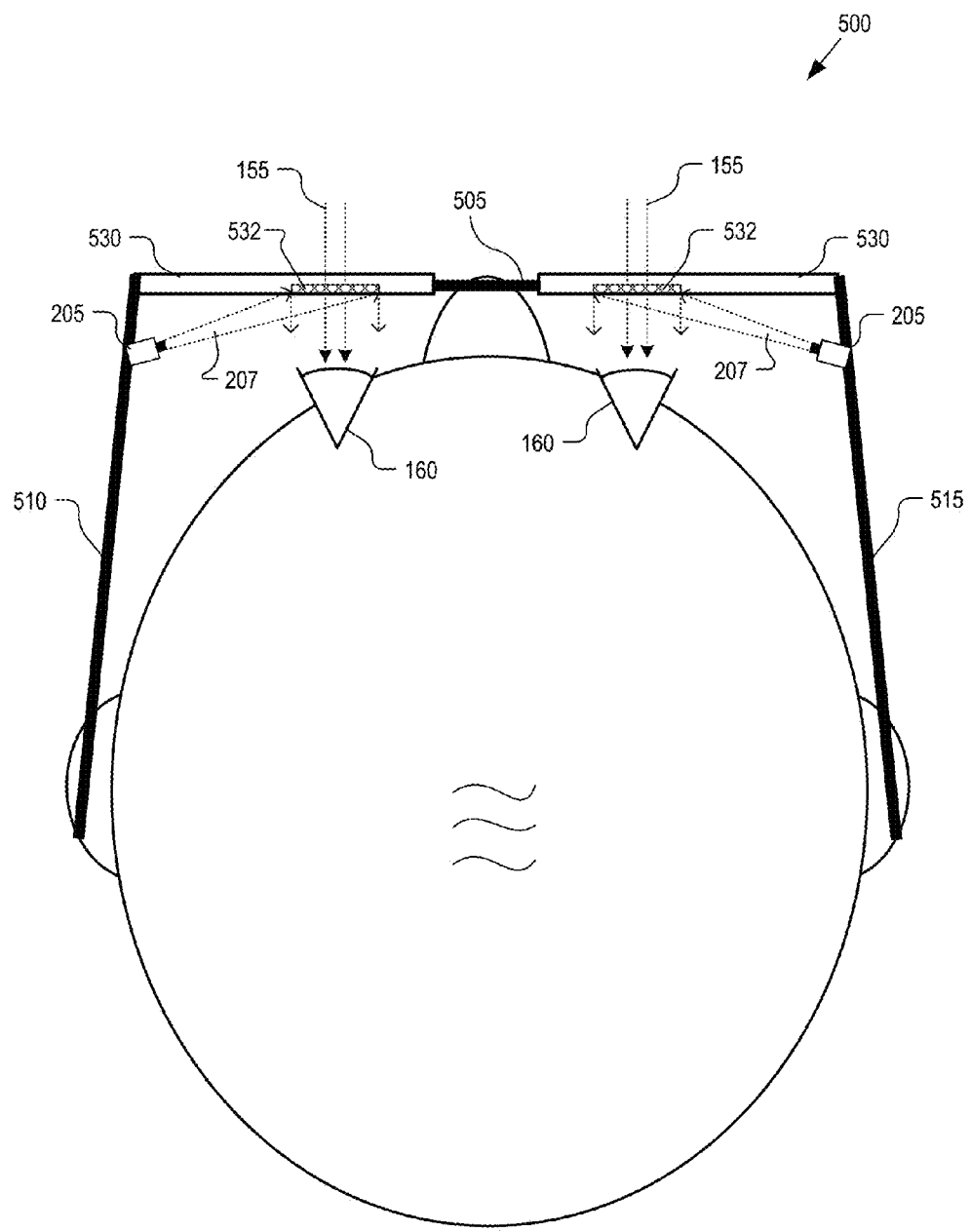
FIG. 5 depicts a top view of a user wearing a binocular head mounted display having optical combiners that include an OASML, in accordance with an embodiment of the disclosure.

FIG. 5 depicts a top view of a user wearing a binocular head mounted display 500 having optical combiners that include an OASML, in accordance with an embodiment of the disclosure. Each optical combiner 530 may be implemented with an embodiment of optical combiners 230A or 330A and each OASML 532 in optical combiner 530 may be implemented with reflective OASML 231 or OASML 331. Although not illustrated, optical combiners 230B and 330B and corresponding transmissive OASMLs 232 and 332 can be similarly implemented with the appropriate placement of display module 205, as illustrated in FIGS. 2B and 3B.

The optical combiners 530 are mounted to a frame assembly, which includes a nose bridge 505, left ear arm 510, and right ear arm 515. Although FIG. 5 illustrates a binocular embodiment, HMD 500 may also be implemented as a monocular HMD. The two optical combiners 530 are secured into an eye glass arrangement that can be worn on the head of a user. The left and right ear arms 510 and 515 rest over the user's ears while nose bridge 505 rests over the user's nose. The frame assembly is shaped and sized to position each optical combiner 530 in front of a corresponding eye 160 of the user. Of course, other frame assemblies having other shapes may be used (e.g., a visor with ear arms and a nose bridge support, a single contiguous headset member, a headband, goggles type eyewear, etc.).

The illustrated embodiment of HMD 500 is capable of displaying an augmented reality to the user. Each optical combiner 530 permits the user to see a real world image via external scene light 155. Left and right (binocular embodiment) image light 207 may be generated by display modules 205 mounted to left and right ear arms 510 and 515. Image light 207 is seen by the user as a virtual image superimposed over the real world as an augmented reality.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A Head Mounted Display ("HMD") comprising:
a display module to generate image light; and
an optical combiner for combining the image light with external scene light, wherein the optical combiner includes an off-axis spatially multiplexed lens ("OASML") optically coupled to receive the image light and direct the image light in an eye-ward direction, the OASML being a transmissive or reflective lens, the OASML including:
a first sub-lens having a first off-axis and having a first optical characteristic for light transmission or reflection, the first sub-lens being optically coupled to receive the image light and direct at least a first portion of the image light to a first eyeward-region; and
a second sub-lens spatially multiplexed with the first sub-lens and optically coupled to receive the image light and direct at least a second portion of the image light to a second eyeward-region different from the first eyeward-region, wherein the second sub-lens has a second off-axis different from the first off-axis and having a second optical characteristic for light transmission or reflection different from the first optical characteristic.

2. The HMD of claim 1, wherein the OASML further includes a third sub-lens multiplexed with the first and second sub-lenses, the third sub-lens optically coupled to receive the image light and direct at least a third portion of the image light toward a third eyeward-region different from the first and second eyeward-regions, the third sub-lens having a third off-axis different from the first off-axis and the second off-axis and having a third optical characteristic different from the first optical characteristic and the second optical characteristic.

3. The HMD of claim 1, wherein the OASML is an off-axis portion of a dartboard patterned multiplexing of two different lenses having the same aperture, but different optical axes.

4. The HMD of claim 1, wherein the OASML is a reflective lens, and wherein the first sub-lens is coated with a first color filter that reflects a first color light of the image light toward the first eyeward-region and the second sub-lens is coated with a second color filter that reflects a second color light of the image light toward the second eyeward-region, the second color light different from the first color light.

5. The HMD of claim 1, wherein the OASML is a reflective lens, and wherein the first sub-lens includes first diffractive structures tuned to reflect a first color light of the image light toward the first eyeward-region and the second sub-lens includes second diffractive structures tuned to reflect a second color light of the image light toward the second eyeward-region, the second color light different from the first color light.

6. The HMD of claim 1, wherein the OASML is a transmissive lens, and wherein the first sub-lens is coated with a first color filter that transmits a first color light of the image light toward the first eyeward-region and the second sub-lens is coated with a second color filter that transmits a second color light of the image light toward the second eyeward-region, the second color light different from the first color light.

7. The HMD of claim 1, wherein the OASML is a transmissive lens, and wherein the first sub-lens includes first diffractive structures tuned to pass a first color light of the image light toward the first eyeward-region and the second sub-lens includes second diffractive structures tuned to pass a second color light of the image light toward the second eyeward-region, the second color light different from the first color light.

8. The HMD of claim 1, wherein the first sub-lens has a first focal length, and wherein the second sub-lens has a second focal length that is different from the first focal length.

9. An optical combiner to combine image light and external scene light for a Head Mounted Display ("HMD"), the optical combiner comprising:

an off-axis spatially multiplexed lens ("OASML") optically coupled to receive the image light and direct the image light in an eye-ward direction, the OASML being a transmissive or reflective lens, the OASML including:
   a first sub-lens having a first off-axis and having a first optical characteristic for light transmission or reflection, the first sub-lens being optically coupled to receive the image light and direct at least a first portion of the image light to a first eyeward-region; and
   a second sub-lens spatially multiplexed with the first sub-lens and optically coupled to receive the image light and direct at least a second portion of the image light to a second eyeward-region different from the first eyeward-region, wherein the second sub-lens has a second off-axis different from the first off-axis and having a second optical characteristic for light transmission or reflection different from the first optical characteristic.

10. The optical combiner of claim 9, wherein the OASML is a reflective lens, and wherein the first sub-lens includes a first hologram tuned to reflect and focus a first color light of the image light toward the first eyeward-region and the second sub-lens includes a second hologram tuned to reflect and focus a second color light of the image light toward the second eyeward-region, the second color light different from the first color light.

11. The optical combiner of claim 9, wherein the first portion of the image light is a first color of the image light, and wherein the second portion of the image light is a second color of image light different from the first color.

12. The optical combiner of claim 9, wherein the OASML further includes a third sub-lens multiplexed with the first and second sub-lenses, the third sub-lens optically coupled to receive the image light and direct at least a third portion of the image light toward a third eyeward-region different from the first and second eyeward-regions, the third sub-lens having a third off-axis different from the first off-axis and the second off-axis and having a third optical characteristic different from the first optical characteristic and the second optical characteristic.

13. The optical combiner of claim 9, wherein the first sub-lens includes first reflective curvatures including first diffractive structures that selectively reflect a first color of the image light, wherein the first reflective curvatures are configured to reflect and collimate the first color of the image light, and wherein the second sub-lens includes second reflective curvatures including second diffractive structures that selectively reflect a second color of the image light, wherein the second reflective curvatures are configured to reflect and collimate the second color of the image light, the second color different from the first color.

* * * * *